(12) United States Patent
Jones

(10) Patent No.: US 7,002,952 B2
(45) Date of Patent: Feb. 21, 2006

(54) USAGE-BASED BILLING FOR VOICE OVER PACKET COMMUNICATIONS

(75) Inventor: Bryce A. Jones, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 899 days.

(21) Appl. No.: 09/865,267

(22) Filed: May 25, 2001

(65) Prior Publication Data
US 2002/0176547 A1   Nov. 28, 2002

(51) Int. Cl.
H04L 12/50   (2006.01)

(52) U.S. Cl. ................ 370/352; 370/493; 379/114.28

(58) Field of Classification Search ............... 370/352, 370/353, 354, 355, 356, 401, 410, 395.52, 370/467, 328, 402, 396, 400, 422, 493, 494, 370/495, 496; 379/114.21, 114.28, 115.02, 379/126, 127.01, 114.01, 114.03, 114.05, 379/114.1, 115.01
See application file for complete search history.

(56) References Cited

U.S. PATENT DOCUMENTS

| | | | | |
|---|---|---|---|---|
| 5,867,495 | A  * | 2/1999  | Elliott et al. | 370/352 |
| 6,047,051 | A  * | 4/2000  | Ginzboorg et al. | 379/130 |
| 6,240,091 | B1 * | 5/2001  | Ginzboorg et al. | 370/401 |
| 6,658,022 | B1 * | 12/2003 | West et al. | 370/467 |
| 6,724,747 | B1 * | 4/2004  | Arango et al. | 370/352 |
| 6,768,733 | B1 * | 7/2004  | Shankar et al. | 370/352 |
| 6,775,267 | B1 * | 8/2004  | Kung et al. | 370/352 |
| 2002/0010616 | A1 * | 1/2002 | Itzhaki | 705/9 |
| 2002/0046279 | A1 * | 4/2002 | Chung | 709/227 |
| 2002/0064267 | A1 * | 5/2002 | Martin et al. | 379/201.01 |
| 2002/0176378 | A1 * | 11/2002 | Hamilton et al. | 370/328 |
| 2003/0007496 | A1 * | 1/2003 | Brown et al. | 370/401 |

FOREIGN PATENT DOCUMENTS

| | | |
|---|---|---|
| EP | 0948165 A1 | 10/1999 |
| WO | WO 99/07108 | 2/1999 |
| WO | WO 99-14931 | 3/1999 |

* cited by examiner

Primary Examiner—Phirin Sam

(57) ABSTRACT

A communication system is disclosed that provides usage-based billing for voice communications transmitted over a packet system. The communication system is comprised of a packet billing system that sniffs signaling transmitted between a signaling processor and a communication device, such as a switch or a router. If the packet billing system detects a call setup message in the signaling, then the packet billing system generates a start record. If the packet billing system detects a call complete message in the signaling, then the packet billing system generates an end record. The packet billing system transfers the start record and the end record to a conventional public switched telephone network (PSTN) billing system. The PSTN billing system generates a bill for the call based on the start record and the end record. The communication system advantageously provides usage-based billing for packet-based calls using the conventional PSTN billing system.

30 Claims, 8 Drawing Sheets

USAGE-BASED BILLING FOR VOICE OVER PACKET COMMUNICATIONS

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates to communication systems, and more particularly, usage-based billing for voice communications transmitted over a packet system.

2. Description of the Prior Art

Conventional long-distance telephone calls are billed based upon the time that a circuit connects the calling party to the called party. A long distance switch, that connects a telephone of the calling party to a Public Switched Telephone Network (PSTN)-based system, collects billing information for the call. The long distance switch generates call detail records based on the billing information. The call detail record includes the calling party, the called party, the time of day the call was made, and the length of time of the call. The length of time of the call is the amount of time that a circuit connects the two parties. Because the length of time and time of day of a call are easy to determine, such information has typically been used to bill for telephone calls. The long distance switch transfers the call detail records to a PSTN billing system. The PSTN billing system processes the call detail records to generate bills for the calls placed over the PSTN-based system.

Unfortunately, it is difficult for a long distance switch to determine the length of time of a voice communication transmitted over packet network. In a packet network, a user speaks into a telephone that is connected to a switch. For purposes of this discussion, a switch may be a traditional switch, a router, or any other gateway. The switch converts the analog voice signals into digital voice signals. The switch encodes the digital voice signals into packets. The switch then transmits the packets over the packet network to another switch that is connected to the called party.

In a typical voice over packet network, a signaling processor enables communication between parties by determining an address, such as an Internet Protocol (IP) address, for both the called party and calling party. The signal processor then uses messages to inform both the calling party switch and the called party switch of the addresses determined for the communication. The switches then route the packets carrying the voice data back and forth between the parties to provide the voice communication.

Unfortunately, it is not currently practical to bill voice communications over a packet network in the same manner, and using the same billing system, as traditional circuit voice telephone calls. Thus, most providers charge a flat rate for communications because there is no convenient way to quantify use of the network. For instance, it is difficult to count the number packets sent between parties to bill on a per-packet basis. Also, no connection is maintained between the switches in a packet network, which makes determining the length of time of a call difficult. Being unable to utilize the existing billing systems is a particular problem as more voice communications are moved to packet networks to take advantage of increased bandwidth and redundancy that packet networks provide.

SUMMARY OF THE INVENTION

The invention helps to solve the above problems with a usage-based billing system for voice communications transmitted over packet networks. A first advantage of the invention is that the packet billing system could be implemented to operate with existing billing systems to generate bills for the customers. The users will not notice a difference between the bills for packet network calls and traditional circuit calls. A second advantage is that providers can charge users on a usage basis as opposed to flat fees, which is a revenue enhancement.

In one aspect of the invention, a communication system is configured to provide usage based billing for a call transmitted over a packet system. The communication system is comprised of a packet billing system, a communication device, a signaling processor, a packet system, and a public switched telephone network billing system. The packet billing system is configured to detect a call setup message in first signaling transmitted between the signaling processor and the communication device. The packet billing system generates a start record in response to detecting the call setup message. The packet billing system is configured to detect a call complete message in second signaling transmitted between the signaling processor and the communication device. The packet billing system generates an end record in response to detecting the call complete message. The packet billing system transfers the start record and the end record to the public switched telephone network billing system.

The public switched telephone network billing system receives the start record and the end record. The start record and the end record could include a dialed number for the called party. The public switched telephone network billing system processes the start record and the end record to generate a bill.

In another aspect of the invention, the packet billing system generates a call detail record for the call based on the start record and the end record. The packet billing system could also generate the call detail record based on the dialed number, dialing number, and network access identifier. The packet billing system transfers the call detail record to the public switched telephone network billing system. The public switched telephone network billing system processes the call detail record to generate the bill.

In another aspect of the invention, the public switched telephone network billing system also receives call detail records generated by a Public Switched Telephone Network (PSTN)-based system. The public switched telephone network billing system processes the call detail records from the PSTN-based system to generate bills for calls placed over the PSTN-based system. The call detail record generated by the packet billing system emulates the call detail records generated by the PSTN-based system.

In another aspect of the invention, the communication system is comprised of a first communication device, a second communication device, a packet billing system, a signal processor, a trunk signaling gateway, and a packet network. The packet billing system is coupled to a PSTN billing system. To initiate a call with the second communication device, the first communication device transmits first signaling to the signal processor. The signal processor processes the first signaling and responds with second signaling that includes a call setup message. The packet billing system detects the call setup message. The packet billing system generates a call detail record in response to receiving the call setup message. The call detail record includes calling party information, called party information, time of day information, and length of call information.

With the call set up, the first communication device receives user communications for the call. The first communication device encodes the user communications into packets. The first communication device exchanges packets with the second communication device over the packet network. The packet network transfers voice communications using packets. When the call is terminated, the signal processor transfers third signaling to the first communication device. The third signaling includes a call complete message. The packet billing system detects the call complete message. The packet billing system updates the call detail record in response to receiving the call complete message. The packet billing system determines the length of time of the call based on the time of day information in the call detail record. The packet billing system enters the dialed number, dialing number, and length of time in the call detail record and stores the record. The packet billing system transfers the call detail record to the PSTN billing system. The PSTN billing system bills the calling party and/or the called party based on usage according to the call detail record. The billing could be based on local, long distance, or international termination.

BRIEF DESCRIPTION OF THE DRAWINGS

The appended claims set forth the features of the present invention with particularity. The invention, together with its advantages, may be best understood from the following detailed description taken in conjunction with the accompanying drawings.

DETAILED DESCRIPTION OF THE INVENTION

This invention relates to a communication system that generates billing information based upon usage for calls transmitted over a packet system. A call typically includes signaling and user communications. User communications typically include voice communications. A communication system in accordance with this invention may implement any protocol used to transmit user communications over a packet system, including Simple Gateway Control Protocol (SGCP), Session Initiation Protocol (SIP), and H.323 standards. One skilled in the art will appreciate that different protocols may require looking for different types of signaling and messages.

Figure 1:
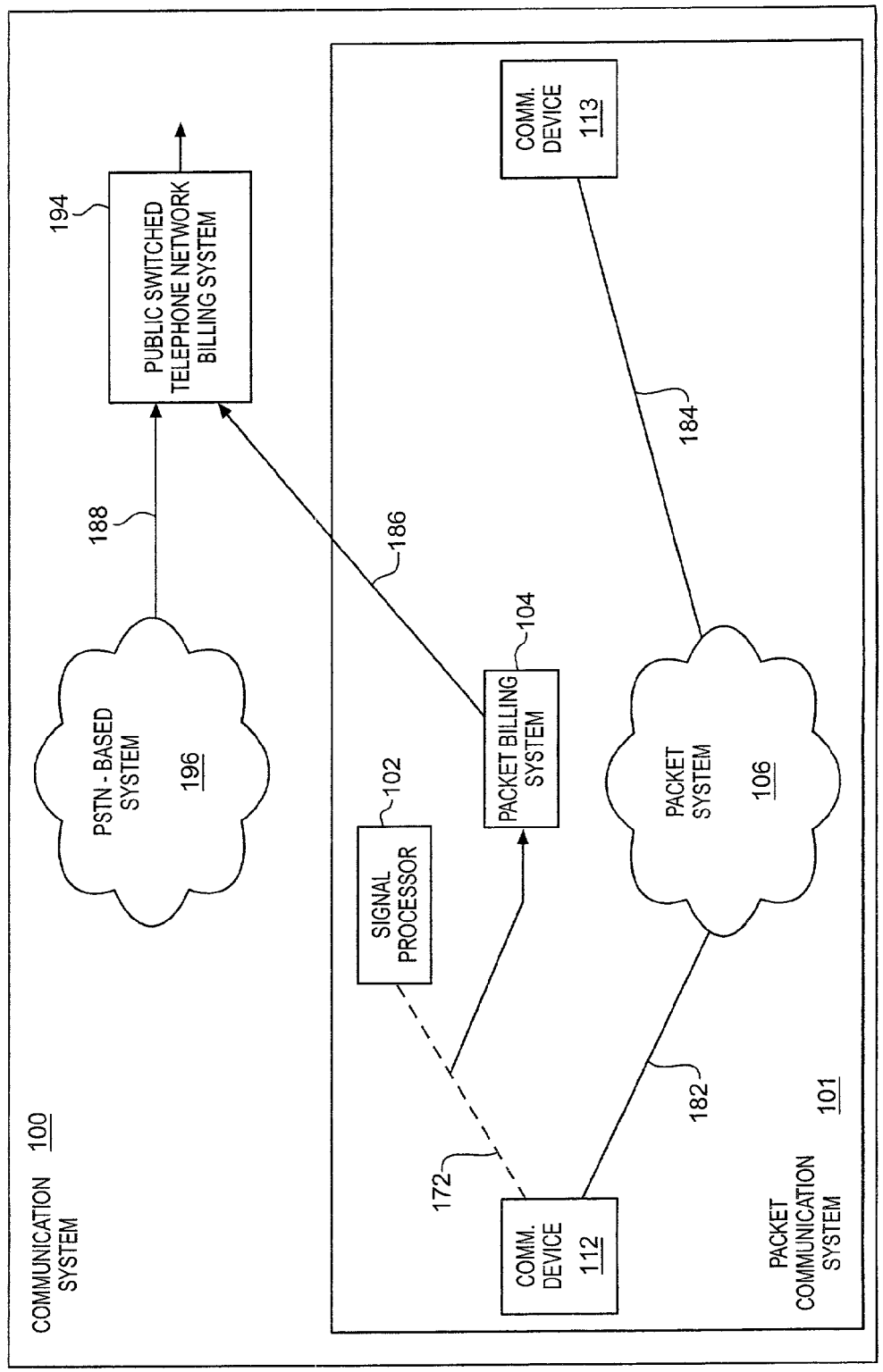
FIG. 1 is a block diagram that depicts a communication system in an example of the invention.

First Embodiment of a Communication System—FIG. 1

FIG. 1 depicts a specific example of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIG. 1 have been simplified or omitted for clarity.

FIG. 1 depicts communication system 100 in an example of the invention. Communication system 100 is comprised of packet communication system 101 coupled to public switched telephone network billing system 194. Public switched telephone network billing system 194 is coupled to PSTN-based system 196 via link 188. Packet communication system 101 comprises communication device 112, signal processor 102, packet billing system 104, packet system 106, and communication device 113. Communication device 112 is configured to communicate with signal processor 102 and packet system 106 over links 172 and 182, respectively. Communication device 113 is configured to communicate with packet system 106 over link 184. Packet billing system 104 is configured to detect signaling transmitted over link 172, and communicate with PSTN billing system 194 over link 186. Communication devices 112-113 could be, but are not limited to, switches and routers. Those skilled in the art will appreciate that links 172, 182, 184 are not necessarily direct links, but could also include other devices that route signals. Link 172 could be routed through packet system 106.

Communication device 112 is any device that transmits and receives signaling within communication system 100. Packet system 106 is any system that transfers data in packets, such as voice data. PSTN billing system 194 is any system capable of generating a bill for a call.

For this example of the operation of communication system 100, assume that communication device 112 has initiated a call with communication device 113 by transmitting signaling to signal processor 102 over link 172. Those skilled in the art will appreciate that some conventional steps for setting up and placing a call will not be discussed for the sake of brevity.

Packet billing system 104 detects a call setup message in first signaling transmitted between signaling processor 102 and communication device 112. Packet billing system 104 generates a start record responsive to detecting the call setup message. Packet billing system 104 detects a call complete message in second signaling transmitted between signaling processor 102 and communication device 112. Packet billing system 104 generates an end record responsive to detecting the call complete message. Packet billing system 104 transfers the start record and the end record.

Public switched telephone network billing system 194 receives the start record and the end record. Public switched telephone network billing system 194 processes the start record and the end record to generate a bill.

In some examples, packet billing system 104 generates a call detail record for the call transmitted over packet system 106 based on the start record and the end record. Packet billing system 104 transfers the call detail record to public switched telephone network billing system 194. Public switched telephone network billing system 194 receives the call detail record and processes the call detail record to generate the bill.

In some examples, PSTN billing system 194 also receives a call detail record generated by PSTN-based system 196 over link 188. PSTN billing system 194 generates bills for calls placed over PSTN-based system 196 based on the call detail record. The call detail record generated by packet billing system 104 emulates the call detail records generated by PSTN-based system 196. Advantageously, packet communication system 101 can use the conventional PSTN billing system 194 to generate bills for customers. The customers would not have to be billed separately for voice over packet communications.

Second Embodiment of the Communication System—FIGS. 2–10

FIGS. 2–10 depict a specific example of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 2–10 have been simplified or omitted for clarity.

Figure 2:
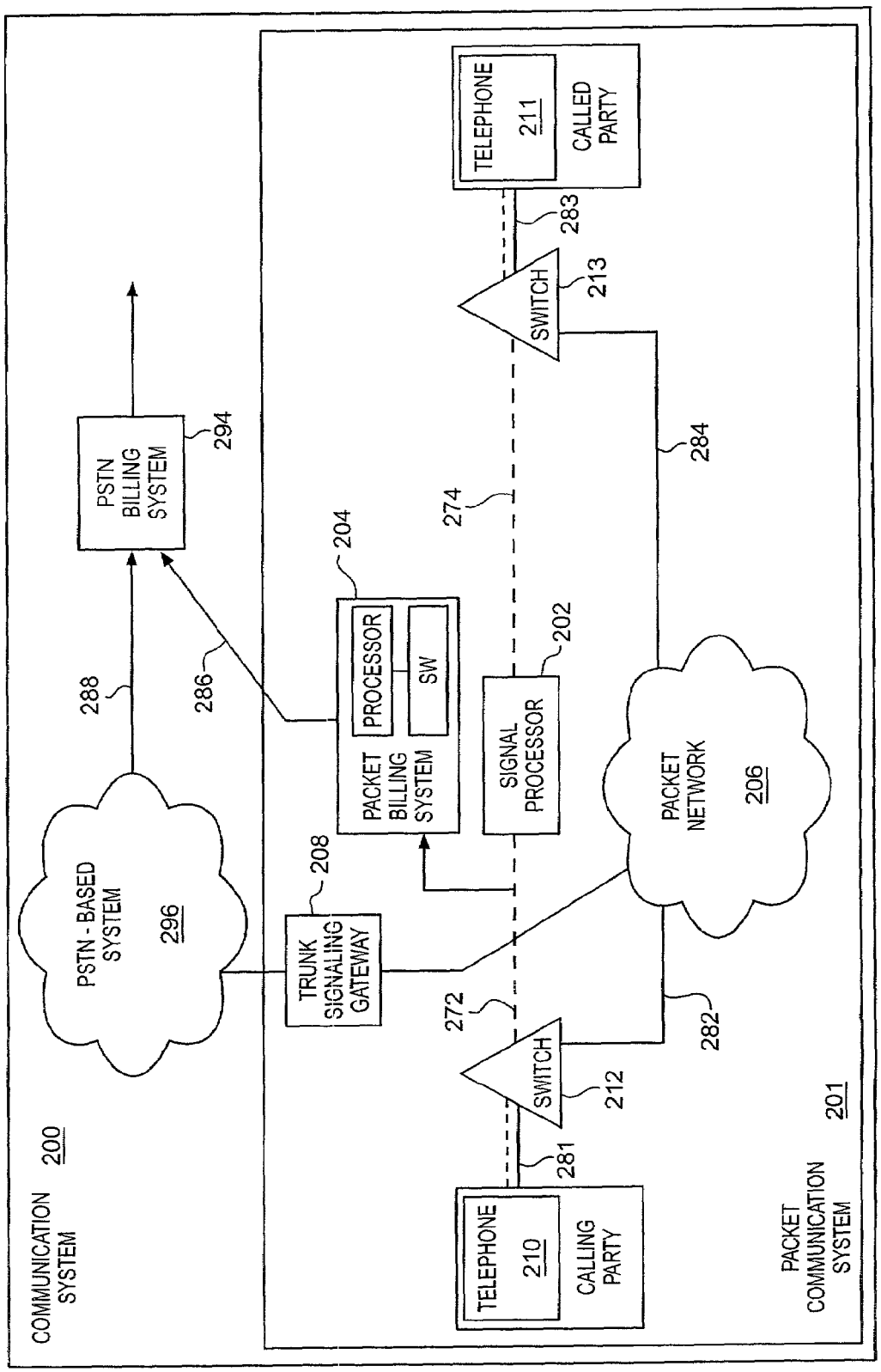
FIG. 2 is a block diagram that depicts a communication system that bills a voice over packet call between a calling party and a called party in an example of the invention.

FIG. 2 depicts communication system 200 in an example of the invention. Communication system 200 is comprised of packet communication system 201 coupled to PSTN billing system 294 and PSTN-based system 296. PSTN billing system 294 is coupled to PSTN-based system 296 via link 288. Packet communication system 201 is comprised of signal processor 202, packet billing system 204, packet network 206, trunk signaling gateway 208, switches 212–213, and telephones 210–211. Telephone 210 is coupled to switch 212 over link 281. Link 281 represents a signaling and bearer link. Switch 212 is coupled to signal processor 202 over link 272. Packet billing system 204 is coupled to PSTN billing system 294 over link 286. Switch 212 is coupled to packet network 206 over link 282. Telephone 211 is coupled to switch 213 over link 283. Link 283 represents a signaling and bearer link. Switch 213 is coupled to signal processor 202 over link 274. Switch 213 is coupled to packet network 206 over link 284. Those skilled in the art will appreciate that links 272, 274 could run through packet network 206.

Those skilled in the art will appreciate that telephones 210–211 could be computers with voice capabilities. Switches 212–213 are gateways. A gateway is a device that converts analog voice signals to digital data and encodes the digital data into packets for transmission across a packet network. Links 282 and 284 are trunks that connect switches 212–213 to packet network 206. Links 282 and 284 may not be traditional trunks. Instead, links 282–284 may be interfaces that connect switches 212–213 to a router or some other device that allows access to packet network 206.

Signal processor 202 is an agent that determines proper addresses for calls and provides the addresses to switches 212 and 213 to properly route the calls. Signal processor 202 generates and transmits the signals needed to establish and maintain the calls. One skilled in the art will understand that links 272 and 274 may include other devices such Signaling Transfer Points (STPs), which are omitted from this discussion for clarity and brevity.

Packet billing system 204 is a device that detects call setup messages and call complete messages to generate start and end records. One skilled in the art will understand that packet billing system 204 may be a separate device or may be included in signal processor 202.

Packet network 206 is any network that transfers data using packets. Examples of packet network 206 include an Internet Protocol (IP) network, an Asynchronous Transfer Mode (ATM) network, and a Frame Relay network. Packet network 206 includes computers and routers that are connected to transfer user communications. Trunk signaling gateway 208 is any system configured to interface packet protocols and PSTN protocols over the signaling and bearer channels.

Figure 3:
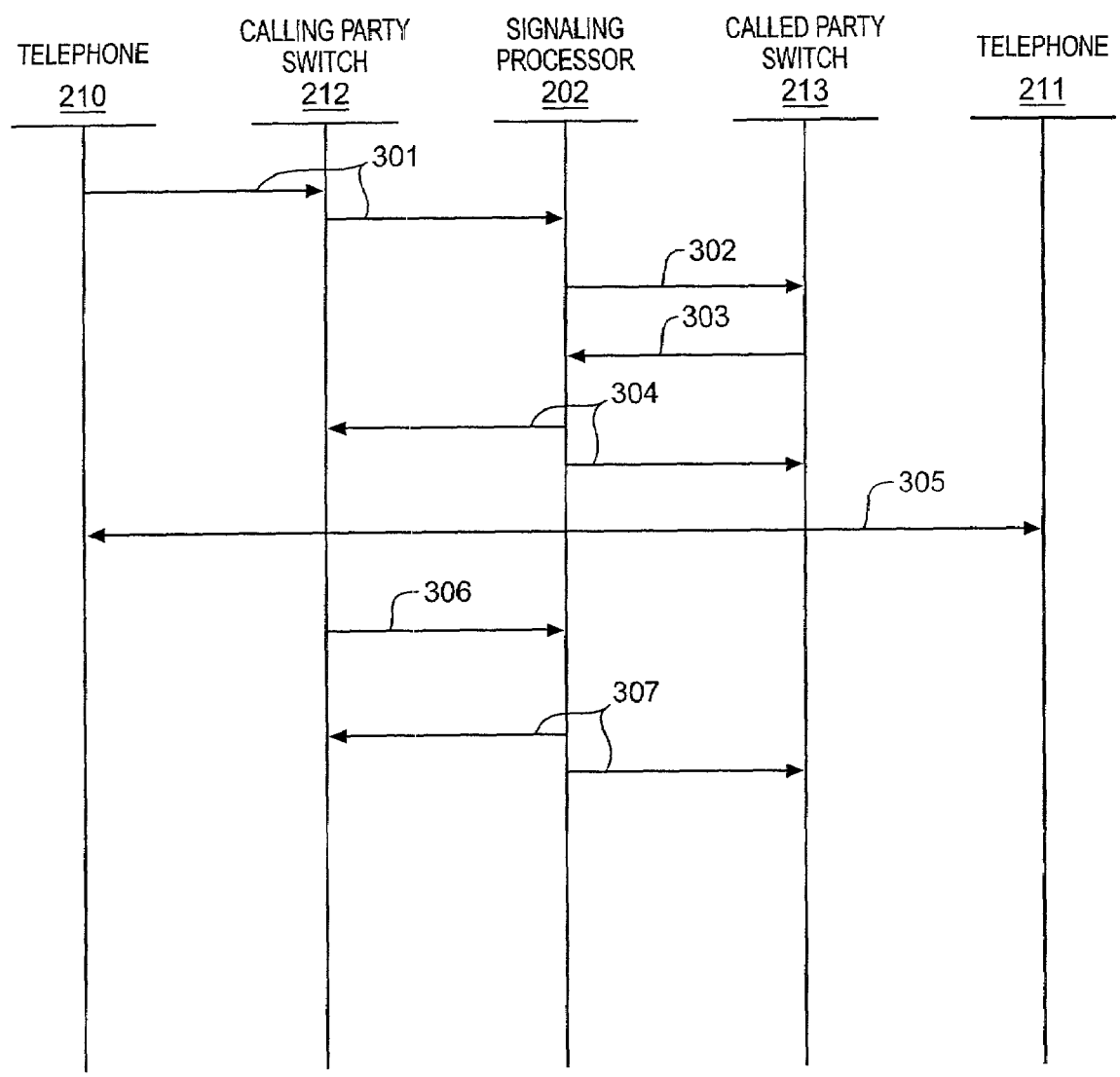
FIG. 3 is a signaling diagram of messages transmitted between devices in the communication system of FIG. 2 in an example of the invention.

FIG. 3 illustrates an example of signaling that occurs to provide billing for a call from telephone 210 to telephone 211. Telephone 210 will also be referred to herein as the calling party. Telephone 211 will also be referred to herein as the called party. Telephone 210 transmits signaling 301 to calling party switch 212 over link 281 that requests a call to telephone 211. Calling party switch 212 sends signaling 301 to signal processor 202 over link 272. Examples of signaling include Signaling System 7 (SS7), C7, Media Gateway Control Protocol (MGCP), and Session Initiation Protocol (SIP). One skilled in the art will recognize that the following steps may involve more signaling depending on the protocol used in packet communication system 201. Signal processor 202 then transmits signaling 302 to called party switch 213 that requests access to telephone 211 for communication with telephone 210. Called party switch 213 responds with signaling 303 that indicates if telephone 211 is available.

Signal processor 202 transmits signaling 304 to calling party switch 212. Signaling 304 includes a call setup message. The call setup message provides calling party switch 212 with information including the address of calling party switch 212 and called party switch 213. The call setup message could be an Initial Address Message (IAM). Signal processor 202 also transmits signaling 304 to called party switch 213 with all of the call information. Packet billing system 204 detects the call setup message transmitted in signaling 304. Packet billing system 204 generates a start record in response to detecting the call setup message.

With the call set up, telephone 210 exchanges voice communications with calling party switch 212. Calling party switch 212 and called party switch 213 exchange packets over packet network 206 and links 232, 284, wherein the packets carry the voice communications. Called party switch 213 exchanges the voice communications with telephone 211. The above communications are depicted as arrow 305.

When the calling party ends the call, calling party switch 212 transmits signaling 306 to signal processor 202 that requests the call be terminated. Signal processor 202 transmits signaling 307 to calling party switch 212. Signaling 307 includes a call complete message. Signal processor 202 also transmits signaling 307 to calling party switch 213. Signaling 307 instructs switches 212–213 to terminate the call. The call complete message invalidates all of the information used to connect the calling party switch 212 and called party switch 213. Packet billing system 204 detects the call complete message transmitted in signaling 304. Packet billing system 204 generates an end record in response to detecting the call complete message.

Packet billing system 204 generates a call detail record based on the start record and the end record. Packet billing system 204 determines the length of the call and the time of day of the call based on the start record and the end record.

Packet billing system 204 transfers the call detail record to PSTN billing system 294. PSTN billing system 294 processes the call detail record to generate a bill for the call. PSTN billing system 294 also receives call detail records from the PSTN-based system 296. PSTN billing system 294 processes the call detail records from the PSTN-based system 296 to generate bills for calls placed over PSTN-based system 296. The call detail records generated by the PSTN-based system 296 and the call detail records generated by packet billing system 204 are substantially similar. Thus, PSTN billing system can advantageously generate bills for calls placed over PSTN-based system 296 and packet network 206.

Figure 4:
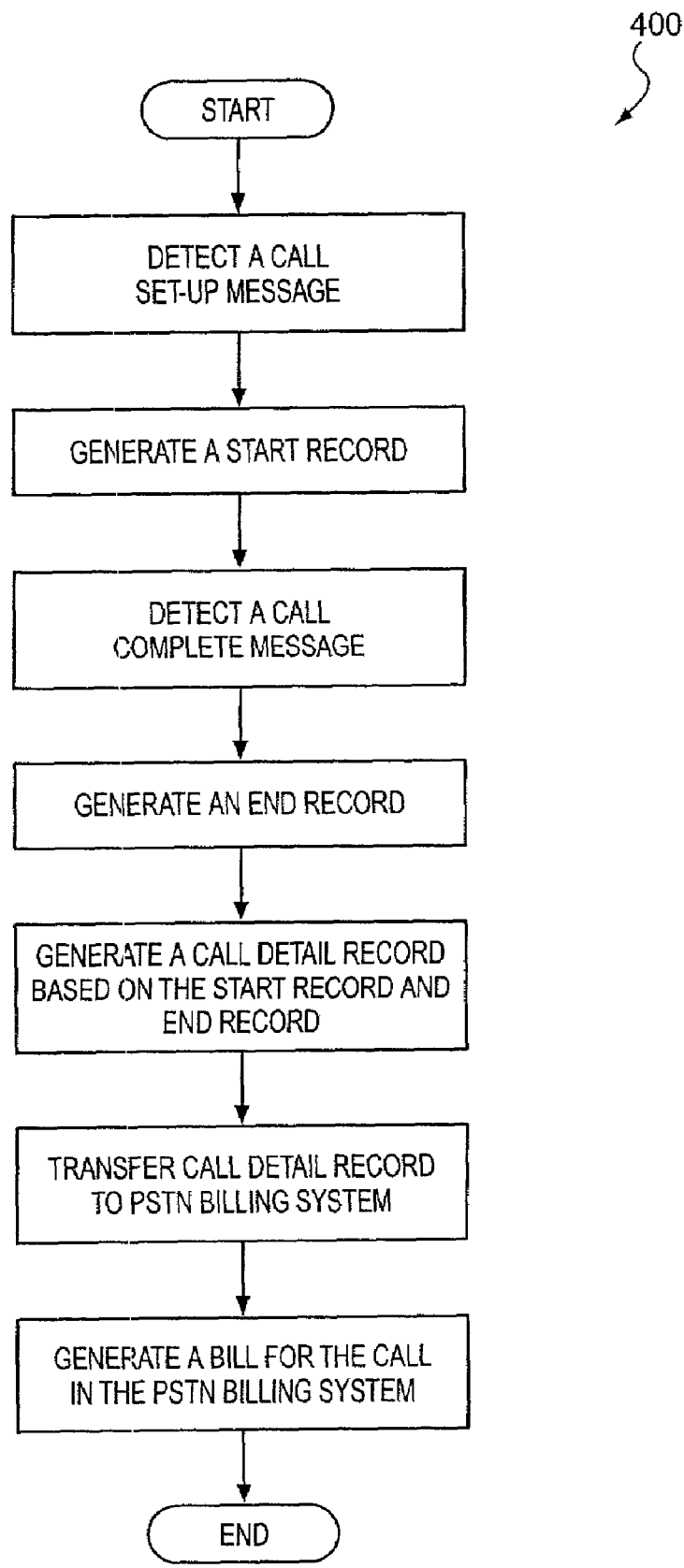
FIG. 4 is a flow diagram of a process executed to bill a call transmitted over a packet network in an example of the invention.
Figure 5:
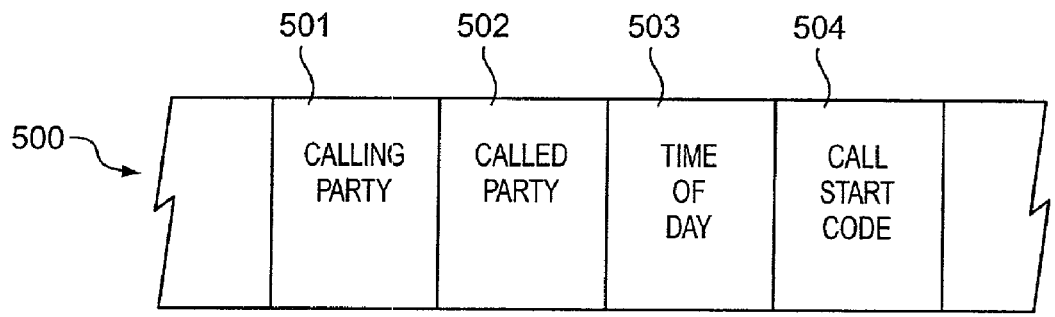
FIG. 5 is a block diagram of data included in a start record in an example of the invention.

FIG. 4 illustrates a process 400 executed by calling party switch 212 and packet billing system 204 to generate billing information for the call. To begin process 400, packet billing system 204 detects a call setup message in signaling transmitted between signal processor 202 and calling party switch 212. The call setup message could be an Initial Address Message (IAM). Packet billing system 204 generates a start record in response to receiving the call setup message. The start record may be configured as shown in FIG. 5. Start record 500 includes a calling party field 501, a called party field 502, a time of day field 503, and a call start code 504. The calling party field 501 and the called party field 502 contain information such as Automatic Number Identification (ANI), telephone numbers, addresses, or some other information. The time of day field 503 contains a time stamp for the time of day that the call was initiated. The call start code field 504 identifies the message and could contain instructions to packet billing system 204.

Figure 6:
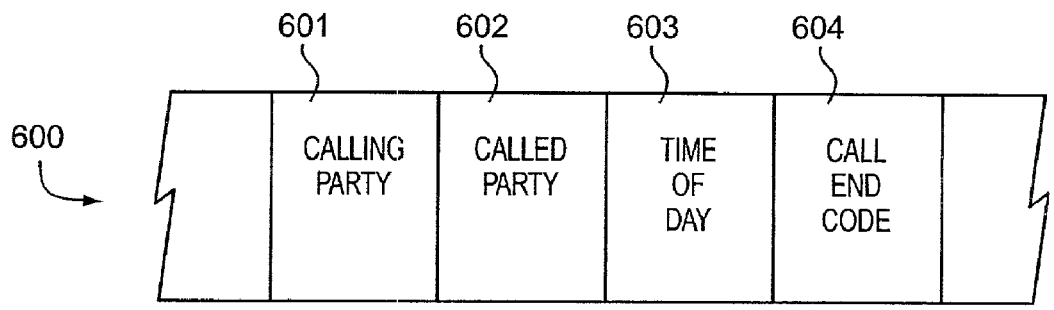
FIG. 6 is a block diagram of data included in an end record in an example of the invention.

Referring again to FIG. 4, packet billing system 204 detects a call complete message in signaling transmitted between signal processor 202 and calling party switch 212. Packet billing system 204 generates an end record in response to receiving the call complete message. The end record may be configured as shown in FIG. 6. End record 600 includes a calling party field 601, a called party field 602, a time of day field 603, and a call end code 604. The calling party field 601 and the called party field 602 contain information such as Automatic Number Identification (ANI), telephone numbers, addresses, or some other information. The time of day field 603 contains a time stamp for the time of day that the call was terminated. The call end code field 604 identifies the message and could contain instructions to packet billing system 204.

Figure 7:
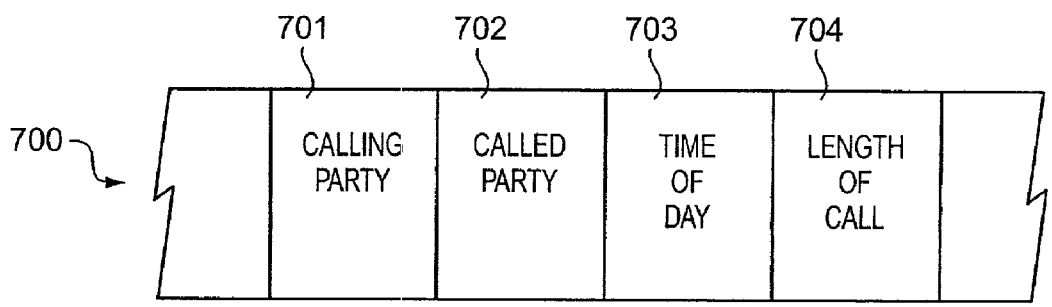
FIG. 7 is a block diagram of data included in a call detail record in an example of the invention.

Referring again to FIG. 4, packet billing system 204 generates a call detail record based on the start record and the end record. The call detail record may be configured as shown in FIG. 7. Call detail record 700 includes a calling party field 701, a called party field 702, a time of day field 703, and a length of call field 704. The calling party field 701 and the called party field 702 contain information such as Automatic Number Identification (ANI), telephone numbers, addresses, or some other information. The time of day field 703 contains a time stamp for the time of day that the call was initiated and a time stamp for the time of day that the call was terminated. The length of call field 704 contains the determined length of the call as determined according to the start time of the call and the end time of the call. Packet billing system 204 transfers the call detail record to PSTN billing system 294. PSTN billing system 294 processes the call detail record to generate a bill for the call. The bill can then be sent to the calling party and/or the called party.

The above-described packet billing system 204 could be comprised of instructions that are stored on storage media. In such a case, packet billing system 204 can be a software product. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 8:
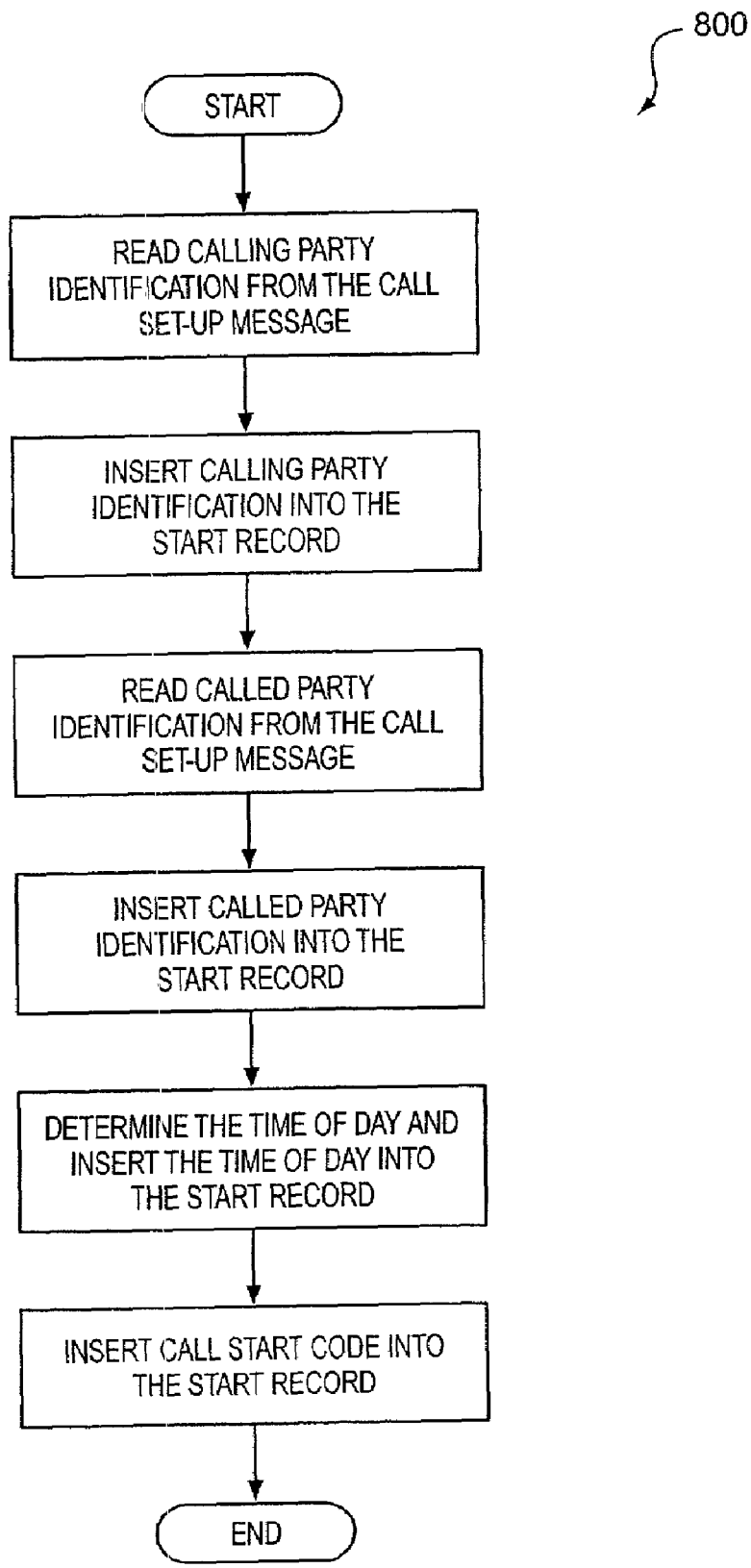
FIG. 8 is a flow diagram of a process for generating a start record in an example of the invention.

FIG. 8 illustrates a process 800 executed by packet billing system 204 to generate a start record, such as in FIG. 6, from a call setup message. To begin, packet billing system 204 reads calling party information from the call setup message. Packet billing system 204 inserts the calling party information into the start record. Packet billing system 204 reads called party information from the call setup message. Switch 212 inserts the called party information into the start record. Packet billing system 204 determines the current time of day based on an internal clock or some other resource. Packet billing system 204 inserts the time of day into the start record. Packet billing system 204 inserts a call start code into the start record to identify the start record and to instruct PSTN billing system 294 how to process the information. Alternatively, packet billing system 204 copies the call setup message to generate the start record.

Figure 9:
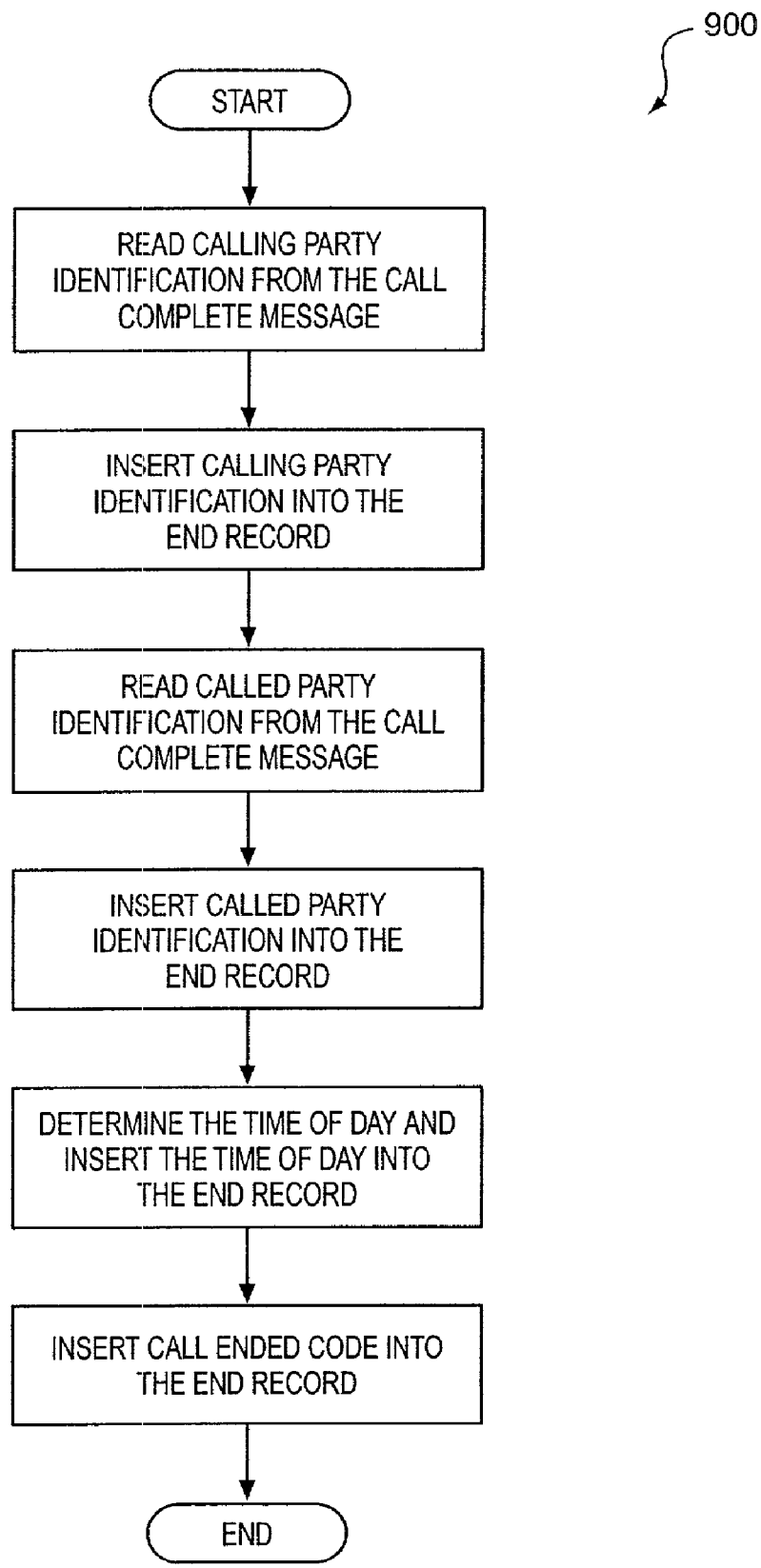
FIG. 9 is a flow diagram of a process for generating an end record in an example of the invention.

FIG. 9 illustrates a process 900 executed by packet billing system 204 to generate a end record, such as in FIG. 7, from a call complete message. To begin, packet billing system 204 reads calling party information from the call complete message. Packet billing system 204 inserts the calling party information into the end record. Packet billing system 204 reads called party information from the call complete message. Switch 212 inserts the called party information into the end record. Switch 212 determines the current time of day based on an internal clock or some other resource. Switch 212 inserts the time of day into the end record. Switch 212 inserts a call end code into the end record to identify the end record and instruct PSTN billing system 294 how to process the information. Alternatively, packet billing system 204 copies the call complete message to generate the end record.

Figure 10:
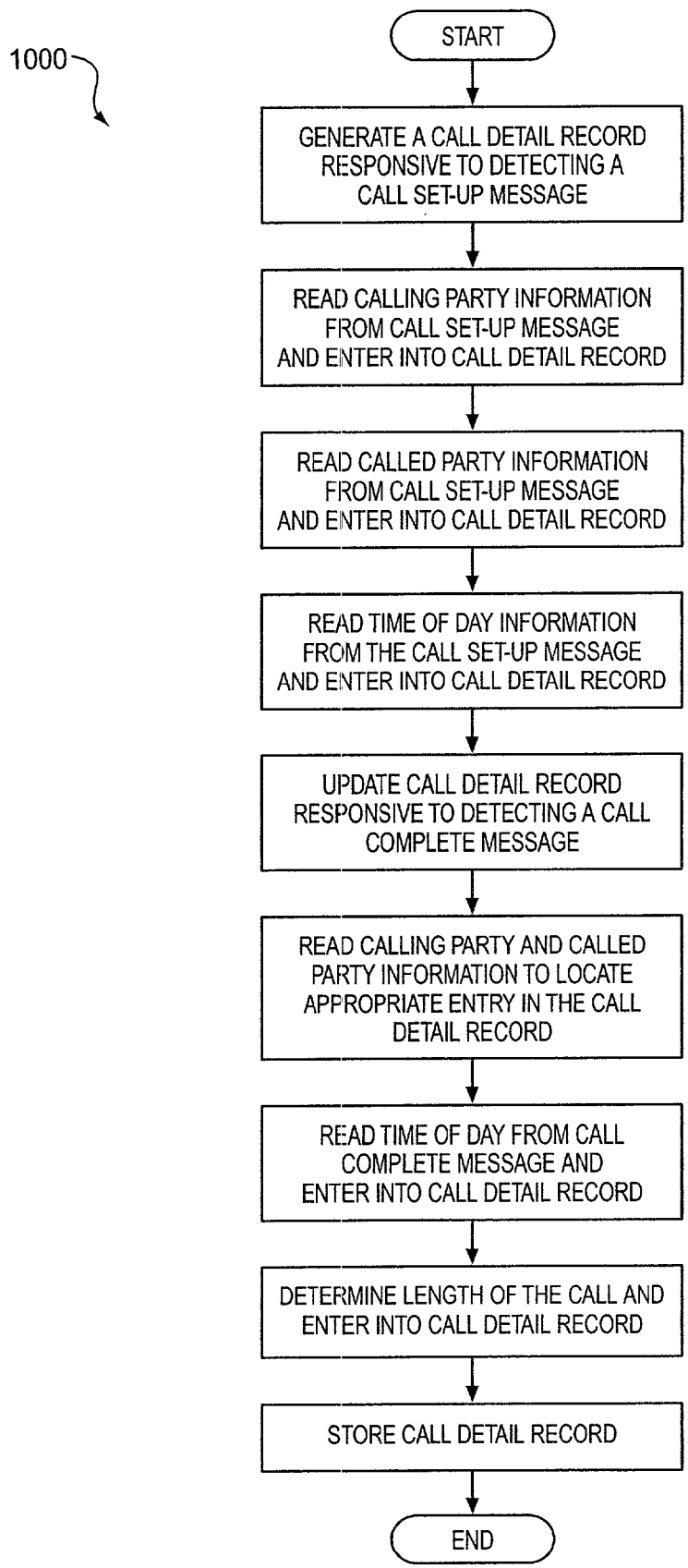
FIG. 10 is a flow diagram of a process for generating a call detail record in an example of the invention.

FIG. 10 illustrates a process 1000 executed by packet billing system 204 to generate the call detail record. When a call is initiated, packet billing system 204 detects a call setup message. Packet billing system 204 generates a call detail record in response to detecting the call setup message. Packet billing system 204 reads the calling party information from the call setup message and enters the calling party information into the call detail record. Packet billing system 204 reads the called party information from the call setup message and enters the called party information into the call detail record. Packet billing system 204 reads the time of day information from the call setup message. This time of day information represents the start time of the call. Packet billing system 204 enters the start time into the call detail record.

After the call is terminated, packet billing system 204 detects a call complete message. Packet billing system 204 updates the call detail record in response to detecting the call complete message. To update the call detail record, packet billing system 204 reads the calling party information and the called party information from the call complete message. Packet billing system 204 compares the calling party information and the called party information to the call detail record to locate the appropriate entry in the call detail record. Packet billing system 204 reads the time of day information from the call complete message. This time of day information represents the end time of the call. Packet billing system 204 enters the end time into the call detail record. Packet billing system 204 determines the length of time of the call based on the start time and the end time. Packet billing system 204 enters the length of time into the call detail record. Packet billing system 204 stores the call detail record.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a communication system to bill a call transmitted over a packet system wherein the communication system is comprised of a communication device, a signaling processor, a packet billing system, a public switched telephone network billing system, and the packet system, and wherein the communication device is configured to communicate the call over the packet network, the method comprising:

in the packet billing system:
  detecting a call setup message in first signaling transmitted between the signaling processor and the communication device, and generating a start record responsive to detecting the call setup message,
  detecting a call complete message in second signaling transmitted between the signaling processor and the communication device, and generating an end record responsive to detecting the call complete message, and
  transferring the start record and the end record; and
in the public switched telephone network billing system, receiving the start record and the end record and processing the start record and the end record to generate a bill.

2. The method of claim 1 further comprising:
in the packet billing system, generating a first call detail record for the call transmitted over the packet system based on the start record and the end record, and transferring the first call detail record; and
in the public switched telephone network billing system, receiving the first call detail record and processing the first call detail record to generate the bill.

3. The method of claim 2 wherein generating the first call detail record comprises:
  reading a calling party identification, a called party identification, and first time of day information from the call setup message and entering the calling party identification, the called party identification, and the first time of day information into the first call detail record; and
  reading the calling party identification, the called party identification, and second time of day information from the call complete message and entering the second time of day information into the first call detail record.

4. The method of claim 3 wherein generating the first call detail record further comprises:
  determining a length of time for the call transmitted over the packet system based on the first time of day information and the second time of day information; and
  entering the length of time into the first call detail record.

5. The method of claim 2 further comprising:
  in the public switched telephone network billing system, receiving a second call detail record generated by a Public Switched Telephone Network (PSTN)-based system for a call transmitted over a PSTN, and processing the second call detail record to generate the bill;
  wherein the first call detail record generated by the packet billing system emulates the second call detail record generated by the PSTN-based system.

6. The method of claim 1 wherein the communication device comprises a switch.

7. The method of claim 1 wherein the communication device comprises a router.

8. The method of claim 1 wherein generating the start record comprises copying the call setup message.

9. The method of claim 1 wherein generating the start record comprises:
  reading a calling party identification from the call setup message and inserting the calling party identification into the start record;
  reading a called party identification from the call setup message and inserting the called party identification into the start record; and
  determining time of day information and inserting the time of day information into the start record.

10. The method of claim 1 wherein generating the end record comprises copying the call complete message.

11. The method of claim 1 wherein generating the end record comprises:
  reading a calling party identification from the call complete message and inserting the calling party identification into the end record;
  reading a called party identification from the call complete message and inserting the called party identification into the end record; and
  determining time of day information and inserting the time of day information into the end record.

12. A communication system configured to generate a bill for a call transmitted over a packet system, comprising:
  a signaling processor;
  a communication device configured to communicate with the signaling processor and communicate the call over the packet system;
  a packet billing system configured to detect a call setup message in first signaling transmitted between the signaling processor and the communication device, generate a start record responsive to detecting the call setup message, detect a call complete message in second signaling transmitted between the signaling processor and the communication device, generate an end record responsive to detecting the call complete message, and transfer the start record and the end record; and
  a public switched telephone network billing system configured to receive the start record and the end record, and process the start record and the end record to generate a bill.

13. The communication system of claim 12 wherein:
  the packet billing system is further configured to generate a first call detail record for the call transmitted over the packet system based on the start record and the end record, and transfer the first call detail record; and
  the public switched telephone network billing system is further configured to receive the first call detail record and process the first call detail record to generate the bill.

14. The communication system of claim 13 wherein the packet billing system is further configured to:
read a calling party identification, a called party identification, and first time of day information from the call setup message and enter the calling party identification, the called party identification, and the first time of day information into the first call detail record; and
read the calling party identification, the called party identification, and second time of day information from the call complete message and enter the second time of day information into the first call detail record.

15. The communication system of claim 14 wherein the packet billing system is further configured to determine a length of time for the call transmitted over the packet system based on the first time of day information and the second time of day information, and enter the length of time into the first call detail record.

16. The communication system of claim 13 wherein:
the public switched telephone network billing system is further configured to receive a second call detail record generated by a Public Switched Telephone Network (PSTN)-based system for a call transmitted over a PSTN, and process the second call detail record to generate the bill;
wherein the first call detail record generated by the packet billing system emulates the second call detail record generated by the PSTN-based system.

17. The communication system of claim 12 wherein the communication device comprises a switch.

18. The communication system of claim 12 wherein the communication device comprises a router.

19. The communication system of claim 12 wherein the communication device is configured to copy the call setup message to generate the start record.

20. The communication system of claim 12 wherein the communication device is configured to:
read a calling party identification from the call setup message and insert the calling party identification into the start record;
read a called party identification from the call setup message and insert the called party identification into the start record; and
determine time of day information and insert the time of day information into the start record.

21. The communication system of claim 12 wherein the communication device is configured to copy the call complete message to generate the end record.

22. The communication system of claim 12 wherein the communication device is configured to:
read a calling party identification from the call complete message and insert the calling party identification into the end record;
read a called party identification from the call complete message and insert the called party identification into the end record; and
determine time of day information and insert the time of day information into the end record.

23. A software product for operating a communication system to bill a call transmitted over a packet system, wherein the communication system is comprised of a communication device, a signaling processor, a packet billing system, a public switched telephone network billing system, and the packet system, and wherein the communication device is configured to communicate the call over the packet network, comprising:
packet billing system software operational when executed by a processor to direct the processor to detect a call setup message in first signaling transmitted between the communication device and the signaling processor, generate a start record responsive to detecting the call setup message, detect a call complete message in second signaling transmitted between the communication device and the signaling processor, generate an end record responsive to detecting the call complete message, and transfer the start record and the end record to the public switched telephone network billing system to generate a bill; and
a software storage medium configured to store the packet billing system software.

24. The software product of claim 23 wherein the packet billing software is further operational to direct the processor to:
generate a call detail record for the call transmitted over the packet system based on the start record and the end record, and transfer the call detail record to the public switched telephone network billing system.

25. The software product of claim 23 wherein the packet billing software is further operational to direct the processor to:
read a calling party identification, a called party identification, and first time of day information from the call setup message and enter the calling party identification, the called party identification, and the first time of day information into the call detail record; and
read the calling party identification, the called party identification, and second time of day information from the call complete message and enter the second time of day information into the call detail record.

26. The software product of claim 25 wherein the packet billing software is further operational to direct the processor to:
determine a length of time for the call transmitted over the packet system based on the first time of day information and the second time of day information, and enter the length of time into the call detail record.

27. The software product of claim 23 wherein the packet billing software is further operational to direct the processor to copy the call setup message to generate the start record.

28. The software product of claim 23 wherein the packet billing software is further operational to direct the processor to:
read a calling party identification from the call setup message and insert the calling party identification into the start record;
read a called party identification from the call setup message and insert the called party identification into the start record; and
determine time of day information and insert the time of day information into the start record.

29. The software product of claim 23 wherein the packet billing software is further operational to direct the processor to copy the call complete message to generate the end record.

30. The software product of claim 23 wherein the packet billing software is further operational to direct the processor to:
read a calling party identification from the call complete message and insert the calling party identification into the end record;
read a called party identification from the call complete message and insert the called party identification into the end record; and
determine time of day information and insert the time of day information into the end record.

* * * * *